United States Patent
Kiontke et al.

(10) Patent No.: US 9,625,623 B2
(45) Date of Patent: Apr. 18, 2017

(54) ARRANGEMENT OF OPTICAL ELEMENTS FOR FOCUSING APPROXIMATELY COLLIMATED BEAMS

(71) Applicant: asphericon GmbH, Jena (DE)

(72) Inventors: Sven Kiontke, Jena (DE); Ulrike Fuchs, Jena (DE)

(73) Assignee: asphericon GmbH, Jena (DE)

( * ) Notice: Subject to any disclaimer, the term of this patent is extended or adjusted under 35 U.S.C. 154(b) by 0 days.

(21) Appl. No.: 15/012,174

(22) Filed: Feb. 1, 2016

(65) Prior Publication Data

US 2016/0223721 A1   Aug. 4, 2016

(30) Foreign Application Priority Data

Jan. 30, 2015  (DE) .................. 10 2015 201 639

(51) Int. Cl.

| | |
|---|---|
| G02B 3/02 | (2006.01) |
| B23K 26/08 | (2014.01) |
| G02B 5/00 | (2006.01) |
| B23K 26/00 | (2014.01) |
| G02B 27/09 | (2006.01) |
| G02B 27/58 | (2006.01) |

(Continued)

(52) U.S. Cl.
CPC .............. *G02B 5/001* (2013.01); *B23K 26/00* (2013.01); *G02B 3/04* (2013.01); *G02B 27/005* (2013.01); *G02B 27/0927* (2013.01); *G02B 27/0972* (2013.01); *G02B 27/40* (2013.01); *G02B 27/58* (2013.01)

(58) Field of Classification Search
CPC ........ G02B 5/001; G02B 3/04; G02B 27/005; G02B 27/0927; G02B 27/0972; G02B 27/40; G02B 27/58; B23K 26/00

USPC .............. 359/558, 641, 709, 741; 219/121.6, 219/121.78

See application file for complete search history.

(56) References Cited

U.S. PATENT DOCUMENTS

| | | | |
|---|---|---|---|
| 5,583,342 A | 12/1996 | Ichie | |
| 8,194,170 B2 | 6/2012 | Golub et al. | |

(Continued)

FOREIGN PATENT DOCUMENTS

| | | |
|---|---|---|
| DE | 10 2007 024 700 A1 | 12/2008 |
| EP | 0 627 643 A2 | 12/1994 |

(Continued)

OTHER PUBLICATIONS

Japanese Office Action for Japanese Application No. 2016-014967 dated Dec. 14, 2016 with English translation.

(Continued)

*Primary Examiner* — William Choi

(74) *Attorney, Agent, or Firm* — Muncy, Geissler, Olds & Lowe, P.C.

(57) ABSTRACT

A beam focuser for focusing an entrance bundle of approximately collimated beams around an optical axis in a focus area around a focal point. Along the optical path from the light inlet to the light outlet, a first axicon with an axicon angle, and subsequently a second axicon with the same axicon angle are arranged on the inlet side, and an imaging optical system is arranged on the outlet side. The first and second axicon are disposed mirror-symmetrically along the optical axis. The imaging optical system has a focal point which faces the outlet side of the beam focuser.

17 Claims, 2 Drawing Sheets

(51) Int. Cl.
*G02B 3/04* (2006.01)
*G02B 27/00* (2006.01)
*G02B 27/40* (2006.01)

(56) References Cited

U.S. PATENT DOCUMENTS

| | | |
|---|---|---|
| 9,035,217 B2 | 5/2015 | Petring et al. |
| 2001/0017838 A1 | 8/2001 | Hatano et al. |
| 2009/0242523 A1* | 10/2009 | Nakamae ............ B23K 26/0604 219/121.64 |
| 2010/0176103 A1* | 7/2010 | Schulz ............... B23K 26/0604 219/121.72 |
| 2010/0288740 A1 | 11/2010 | Komiya et al. |
| 2013/0021668 A1 | 1/2013 | Kaplan et al. |
| 2013/0155648 A1 | 6/2013 | Morgenbrod et al. |
| 2014/0327960 A1 | 11/2014 | Yoshida et al. |

FOREIGN PATENT DOCUMENTS

| | | |
|---|---|---|
| EP | 2 258 510 A1 | 12/2010 |
| JP | H 08-15156 A | 1/1996 |
| JP | 2003-275888 A | 9/2003 |
| JP | 2007-130675 A | 5/2007 |
| JP | 2009-208092 A | 9/2009 |
| JP | 2009-255163 A | 11/2009 |
| JP | 2010-527792 A | 8/2010 |
| WO | WO 2013/089258 A1 | 6/2013 |

OTHER PUBLICATIONS

P. Tournois, "New Diffraction Grating Pair with Very Linear Dispersion for Laser Pulse Compression," Electronics Letters, vol. 29, No. 16, pp. 1414-1415 (Aug. 5, 1993).

* cited by examiner

ARRANGEMENT OF OPTICAL ELEMENTS FOR FOCUSING APPROXIMATELY COLLIMATED BEAMS

This nonprovisional application claims priority under 35 U.S.C. §119(a) to German Patent Application No. 10 2015 201 639.0, which was filed in Germany on Jan. 30, 2015, and which is herein incorporated by reference.

BACKGROUND OF THE INVENTION

Field of the Invention

The invention relates to an arrangement of optical elements for focusing approximately collimated beams.

Description of the Background Art

Optical elements for beam focusing are known from the prior art, which break collimated input beams around an optical axis into output beams, which overlap in a focus area. Thus, it is possible to convert a comparatively low average inlet irradiance, which is however distributed over a relatively wide entrance pupil, into a comparatively higher average outlet irradiance, which is however concentrated in a relatively narrow cross section of the focus area. From the prior art, the use of such optical elements is known to exceed a minimum irradiance solely within the focus area, above which certain physical effects such as polymerization, optical breakthrough or a melting of solid materials are triggered. Thus, machining of materials or biological tissue is possible in a spatial sector which is relatively sharply limited by the focus area.

Optical elements are advantageous both for achieving particularly high radiation levels as well as for particularly precise machining, with which an input beam of a predetermined cross-section can be focused on a very narrow focus area. For example, for this purpose aspheric lenses are known from the prior art, which can be formed on the basis of the laws of ray optics in such a manner that any input beams for the light of a wavelength extending parallel to the optical axis are refracted into output beams, which intersect at a focal point, which is located at a distance of the focal length from the outlet-side principal plane of the aspheric lens on the optical axis.

Considering wave optical effects, however, no focal point of infinitesimally small extent can be obtained even with such an aspheric lens and also for monochromatic light, but instead only a focus area of finite extent, which is usually indicated by the diameter of the Airy disk, $$d_{Airy} = 1.22 \cdot \frac{\lambda}{n \cdot \sin(\alpha)},$$

wherein $\lambda$ is the wavelength of the monochromatic light, n the refractive index of the medium surrounding the lens, and $\alpha$ the outlet-side half opening angle of the aspheric lens.

Arrangements and methods according to the prior art reduce the extent of the focus area by enlarging the numerical aperture. If the cross section of the entrance pupil remains constant, an increase in the numerical aperture according to the prior art can be achieved by reducing the focal length, thus also reducing the working distance between the front surface of the lens and the material to be machined. According to the prior art, an increase of the numerical aperture can also be achieved by using an immersion fluid which has a higher refractive index than air, between the lens and the material to be machined.

SUMMARY OF THE INVENTION

It is therefore an object of the present invention to provide a beam focuser for focusing approximately collimated light distributed through an entrance pupil of a predefined diameter, which has a narrower focus area and/or a longer working distance and/or a better mobility relative to a material to be machined than arrangements according to the prior art. Also, a method is provided for adjusting such a beam focuser for the application of such a beam focuser and an arrangement for implementing such a method.

In a beam focuser for focusing an entrance bundle of approximately collimated beams around an optical axis in a focus area, a first axicon with an axicon angle, followed by a second axicon with the same axicon angle are arranged on the inlet side, centered along the optical axis of the beam focuser, followed by an imaging optical system arranged on the outlet side. The first and second axicon are arranged mirror-symmetrically along the optical axis, so that either the apexes of both axicons or the flat surfaces of both axicons face each other. Thus, either the planar surface of the first axicon faces the inlet side and the planar surface of the second axicon the outlet side of the beam focuser, or the plane surface of the first axicon faces the outlet side and the planar surface of the second axicon the inlet side of the beam focuser. The imaging optical system arranged on the outlet side has at least one focal point, which lies on the optical axis on the outlet side.

By means of the mirror-symmetrically arranged axicons, an entrance bundle of light rays that is approximately collimated to the optical axis and has an irradiance distributed rotationally symmetrical and Gaussian-shaped around this optical axis, is reshaped into a bundle of light beams situated approximately parallel to the optical axis, which bundle meets the imaging optical system in a circular manner. The imaging optical system focuses this circular bundle of light rays on a focus area located around the focal point of the imaging optical system. Here, the radiation intensity is distributed rotationally symmetrical to the focal point in the focal plane, which includes the focal point and which is pierced by the optical axis at the focal point.

An advantage of the beam focuser according to the invention is that the distribution of irradiance is performed more tightly around the focal point than in beam focusers according to the prior art. The effectiveness range in which the irradiance distribution exceeds a certain predetermined minimum irradiance in the focal plane is formed as a circular area with a smaller diameter than is possible with beam focusers according to the prior art. This allows for greater accuracy in beam focuser applications that are based on a physical effect which essentially only occurs above such a minimum irradiance. Alternatively, it is also possible to produce a higher irradiance within an effectiveness range that is also attainable with beam focusers according to the prior art. Thus, a minimum irradiance of physical effects can be achieved which was not or was only insufficiently achieved with previously known beam focusers.

Advantageously, the optical imaging system arranged on the outlet side is designed according to the invention as an aspheric lens in the beam focuser. The aspheric lens can thereby be designed as a plano-convex aspheric lens with a convex surface arranged on the outlet side, with which it is possible to achieve diffraction-limited focusing in a very narrow focus range in collimated rays of an entrance bundle situated parallel to the optical axis, while avoiding spherical aberration.

The aspheric lens may also be formed as a biconvex lens having two curved surfaces. Advantageously, therefore, a greater robustness against tilting of the optical elements of the beam focuser against one another and/or relative to the optical axis can be achieved. The biconvex lens may be formed as a biaspheric lens having two curved aspheric surfaces. Via a suitable curvature of the inlet-side aspherical surface, it is also possible to focus not perfectly collimated beams of an inlet beam in the focus area, i.e. beams converging or diverging up to a predetermined angle of convergence or divergence.

The imaging optical system may also be designed as a plano-convex spherical lens or a bispheric lens that can be manufactured particularly easily and inexpensively, although such a plano-convex spherical or bispheric lens has a spherical aberration. For certain applications of beam focusers where only an effectiveness range needs to be achieved with a predetermined area without considering image sharpness, such spherical aberrations can be tolerated.

The imaging optical system can also be designed as a concave-convex converging lens, or as a meniscus lens, having a convex outlet side and a concave surface on the inlet side. Thus, advantageously, converging or diverging, i.e. not perfectly collimated, beams of an entrance bundle can be focused in the focus area up to a predetermined angle of convergence or divergence. By means of such concave-convex converging lenses, it is also possible to achieve improved robustness against tilting of the optical components of the beam focusers towards each other and/or the optical axis.

Further, it is possible to assemble an optical imaging system as a system of lenses having spherical and/or aspherical and/or flat surfaces. By means of such a composite imaging optical system, it is possible for example to reduce the expansion of the focus area, and thus also of the effectiveness range, caused by the chromatic aberration, when the entrance bundle comprises the light of different wavelengths.

In one embodiment of the beam focuser according to the invention, the distance between the first and second axicon is adjustable. In an advantageous manner, the light ring directed to the imaging optical system can be widened or narrowed by increasing or decreasing this distance, whereby the position of the focal plane and/or the irradiance distribution in the focal plane can be changed.

If the imaging optical system is formed as an aspheric lens, the radius of curvature rotationally symmetrical to the optical axis at any point on the inlet-side aspherical surface and/or on an outlet-side aspheric surface can be selected such, that an infinitesimally narrow ring of light entering in the aspheric lens is focused as a function of its diameter at different locations on the outlet side along the optical axis. Thus, it is possible in this embodiment of the invention to shift the focal plane by varying the distance between the first and second axicon along the optical axis. Advantageously, for example, the working distance between the beam focuser and a workpiece or material to be machined can thus be changed.

In one embodiment of the invention, a diffractive optical element having the same transmission function is disposed on the plane surface of the first axicon and on the plane surface of the second axicon, respectively. The transmission function of these diffractive optical elements is chosen such that the group velocity dispersion of an ultrashort laser pulse is approximately minimized along the beam path by the beam focuser. Optionally, the transmission function of this diffractive optical element can also be selected such that dispersions of a higher order are minimized for such an ultrashort laser pulse. Advantageously, the time length and/or the distortion of the pulse shape of such an ultrashort laser pulse is limited or minimized in the focus area of the beam focuser.

In an adjustment method for adjusting a beam focuser according to the invention with an adjustable distance between the first and second axicon, this distance is adjusted according to a calculated or experimentally determined characteristic, which indicates this distance as a function of the wavelength of substantially monochromatic light such that for this light, a focus area with minimal expansion is achieved. In an advantageous manner, a beam focuser can thus be realized, which can be operated with monochromatic light of different wavelengths, and for which the effectiveness range, in which a minimum radiation intensity is exceeded and which is adapted to the wavelength of this monochromatic light, is limited or minimized. It is thus possible in a simple manner to operate a beam focuser with different light sources, for example, with different laser sources or a tunable laser, which are optimally adapted to the material or the workpiece to be machined.

In an adjustment method for adjusting a beam focuser according to the invention with an adjustable distance between the first and second axicon, it is also possible to change the distance between the focal plane and thus the distance between the focus area and the imaging optical system along the optical axis by varying this distance according to a calculated or experimentally determined characteristic. Thus, such a beam focuser can advantageously be adjusted for different working distances to the processed material or workpiece that are optimized for the respective machining purpose.

In a method for focusing an approximately collimated beam with a beam focuser according to the invention, an irradiance above an irradiance threshold for a physical effect can be achieved within the focus area, wherein the physical effect is nearly completely absent with an irradiance below the irradiance threshold. Advantageously, it is thus possible to achieve this physical effect within an effectiveness range with an approximately circular cross-section and a particularly small diameter in comparison to methods according to the prior art. Thus, machining processes are possible with a particularly high accuracy and/or resolution.

For example, it is possible that the effect is due to a polymerization which is almost completely carried out at or above an irradiance threshold value, and which is almost absent below this irradiance threshold value. Thus, by means of a beam focuser according to the invention, such so-called 3D printing processes which are based on a polymerization induced via radiation can be advantageously performed with a particularly high resolution.

In a further embodiment of the method, it is possible to trigger an optical breakthrough above an irradiance threshold in a particularly small and very precisely delimited area in a processed material. This allows for methods of laser-induced cavitation known from the prior art, for example separating corneal tissue or lens tissue during a laser-assisted in situ keratomileusis (LASIK) surgery using ultrashort laser pulses, to be particularly accurately and carefully carried out. However, numerous other methods for laser surgery known from the prior art can also be performed with improved accuracy and resolution.

In a further embodiment of the method, a solid material is melted above an irradiance threshold value. This allows methods of laser welding or laser cutting known from the prior art to be particularly accurate and/or to achieve particularly narrow weld seams or joints.

In an arrangement for performing a method for focusing an approximately collimated beam with a beam focuser according to the invention, the inlet side of the beam focuser is illuminated with approximately collimated light. Advantageously, available laser sources can be used which are inexpensive and powerful.

In an embodiment of such an arrangement, the beam focuser outlet side can be connected to the focus area through an immersion liquid with a refractive index greater than 1, which causes an increase in the numerical aperture of the beam focuser. This results in a narrowing of the focus area and thus an increased irradiance intensity in the focal plane and/or a reduced cross-section of the effectiveness range with unchanged geometry and irradiance of the inlet side illumination of the beam focuser. It is also possible to increase the cross section of the entrance bundle of light rays without changing the focus area and therefore injecting a higher light energy into the beam focuser, achieving a higher irradiance in the focal plane. Furthermore, it is possible to reduce the diameter of the imaging optical system with an unchanged focus area and an unaltered cross-section of the entrance bundle, and to thus use a beam focuser which is cheaper and easier to manufacture.

In a further embodiment of such an arrangement, an optically transmissive protective element can be disposed between the beam focuser according to the invention and the focus area, which in an advantageous manner prevents contamination of or mechanical damage to the beam focusers, in particular to the imaging optical system arranged outlet-side. For example, such a protective element can prevent or reduce deposition of evaporated or splashed material on the imaging optical system of the beam focuser during laser welding or laser cutting.

In a further development of this embodiment of the invention, the protective element is replaceable. Advantageously, in particular in pollution-intensive processing methods, a contaminated protective element can therefore be exchanged with little effort for a new or cleaned protective element, or be removed for cleaning. Thus, machining with essentially permanently undiminished irradiance and also a reduced set-up or maintenance time can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
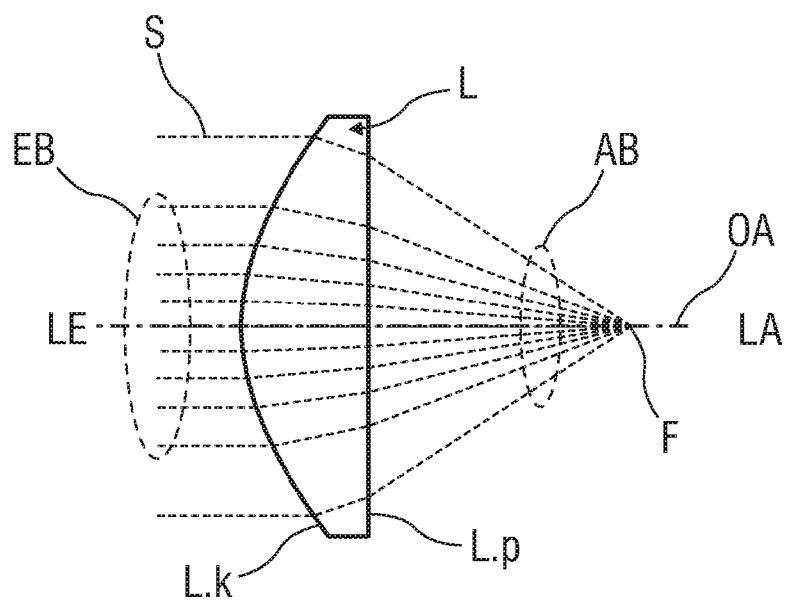
FIG. 1 schematically shows the beam path using a plano-convex aspheric lens.

FIG. 1 schematically shows the path of the light beams S through a plano-convex aspheric lens L with an optical axis OA according to the prior art. An entrance bundle EB to the optical axis OA of collimated input beams enters at the light inlet LE into the plano-convex aspheric lens L at its convex surface L.k. An outlet bundle AB of convergent output beams again exits at the light outlet LA on the flat surface L.p of the plano-convex aspheric lens L. The convex surface L.k is shaped rotationally symmetrical to the optical axis OA in such a way that according to the laws of geometrical optics, the output beams would intersect at a focus or focal point F situated on the outlet side of the plano-convex aspheric lens L.

However, contrary to the laws of geometrical optics, the diffraction to be considered because of the wave nature of the light results in that not the entire radiation flux that is distributed to all incoming light rays S is concentrated at the focal point F, but rather is distributed rotationally symmetrical to the optical axis OA in a focal plane, wherein the focal plane is the plane that contains the focal point F and is therein pierced perpendicular to the optical axis OA.

Figure 2:
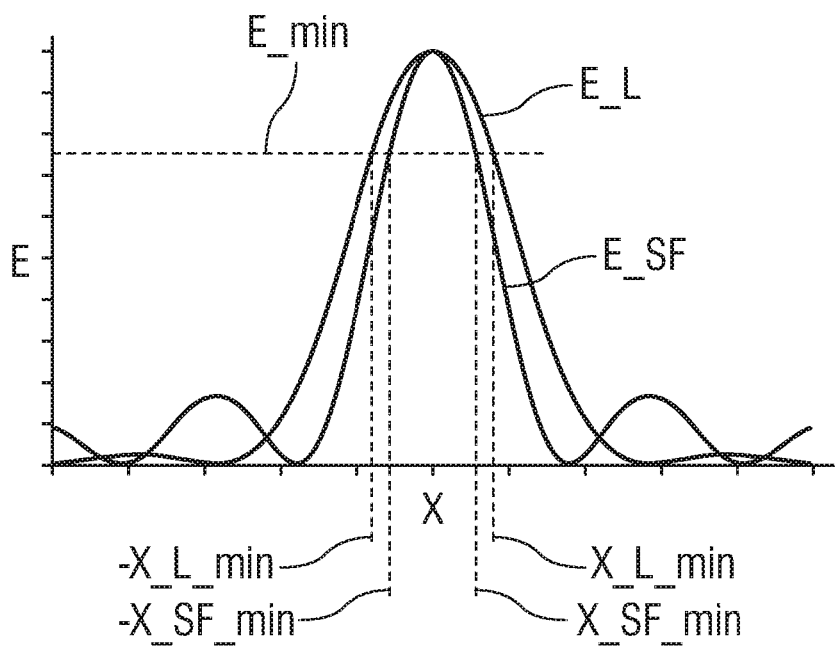
FIG. 2 schematically shows the profile of the irradiance using a focus area along the distance from the optical axis and FIG. 3 schematically shows the beam path using an arrangement for beam focusing with two axicons.

FIG. 2 schematically shows the distribution of the irradiance in the focal plane along any imaginary line through the focal point F as an irradiance profile, wherein on the position axis X, the distance of a position x to the focal point F, and on the irradiance axis E, the value of the radiation intensity, which is measured at this distance x, are plotted. Positions located along the imaginary line through the focal point F, at the same distance but in the opposite direction from the focal point F, carry opposite signs.

If a plano-convex aspheric lens L is illuminated with an entrance bundle EB of collimated beams S, as shown schematically in FIG. 1, and if this entrance bundle EB has an irradiance distribution which is rotationally symmetric and Gaussian-shaped around the optical axis OA, the result in the focal plane is an irradiance distribution that is rotationally symmetrical around the axis OA, and an irradiance profile $E\_L$ with a maximum at the position $x=0$, i.e. at the location of the focal point F, which is surrounded by two zeros. The rotational symmetry of the irradiance distribution relative to the optical axis OA is followed by a mirror-symmetrical path of the irradiance profile $E\_L$, relative to the vertical by the position $x=0$.

If a certain minimum irradiance $E\_min$ is needed for obtaining a certain physical effect, for example for a polymerization, an optical breakthrough or the melting of a material, this physical effect in the focal plane is achieved only within an effectiveness range around the optical axis OA, which radius is determined by the distance value $x\_L\_min$ at which the minimum irradiance $E\_min$ is just reached by the irradiance profile $E\_L$.

The position of the two zeros of the irradiance profile $E\_L$ surrounding the maximum at the focal point F is determined by the numerical aperture of the plano-convex convex aspheric lens L. An increase in the numerical aperture causes a moving together of these zeros and thus, since the total radiation power remains unchanged as the area under the irradiance profile $E\_L$, a higher maximum and a steeper drop around this maximum. Arrangements and methods according to the prior art therefore attempt to increase the numerical aperture of the plano-convex aspheric lens L, with the goal of achieving a higher minimum irradiance E_min for achieving a physical effect and/or for improving the accuracy in achieving a physical effect.

Figure 3:
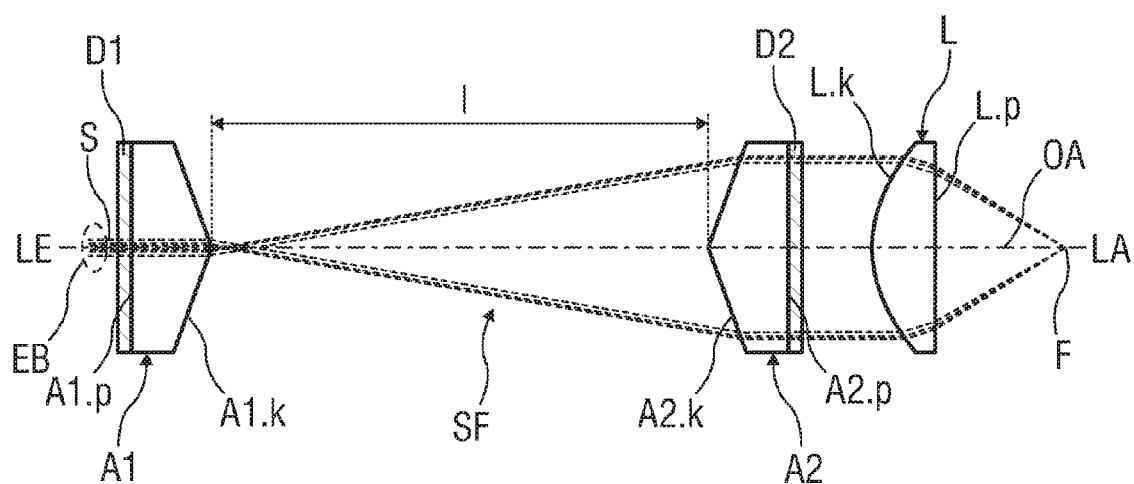

FIG. 3 schematically shows the beam path through an inventive beam focuser SF, with which at the same numerical aperture, a smaller effectiveness range around the focal point F and/or an irradiance that is greater at the focal point F can be achieved than in accordance with the arrangements and methods according to the prior art. The beam focuser SF comprises a first axicon A1, a second axicon A2 and a plano-convex aspheric lens L, which are arranged along a shared optical axis OA.

The first and second axicon A1, A2 are formed as conically ground lenses made of a material with a higher refractive index than air, each with a flat surface A1.p, A2.p and each with a conical lateral surface A1.k, A2.k, wherein said conical lateral surfaces A1.k, A2.k of the first and second axicon A1, A1 have the same opening angle. Thus, the first axicon A1 and the second axicon A1 also have the same axicon angle. The first axicon A1 points with its flat surface A1.p to the light inlet LE of the beam focuser SF, thereby forming its entry hatch. The second axicon A2 points with its flat surface A2.p to the light outlet LA of the beam focuser SF. Thus, the conical lateral surfaces of both axicons A1.k, A2.k oppose one another, rotationally symmetrical with respect to the optical axis OA.

On the flat surfaces A1.p, A2.p of the first and second axicon A1, A2 diffractive optical elements D1, D2 are arranged that have the same transmission function. This transmission function is chosen as to minimize the group velocity dispersion of an ultrashort laser pulse along the beam path through the beam focuser SF. Optionally, this transmission function is chosen as to further minimize higher-order dispersions of an ultrashort laser pulse along the beam path through the beam focuser SF.

On the outlet side after the second axicon A2, the aspherical plano-convex lens L made of a material with a higher refractive index than air is disposed with its flat surface L.p facing the exit of the beam focuser SF. Thus, the convex surface L.k of the plano-convex aspheric lens L is rotationally symmetrical with respect to the optical axis OA, opposing the plane surface A2.p of the second axicon A2. The flat surface L.p of the plano-convex aspheric lens L forms the exit hatch of the beam focuser SF.

An entrance bundle EB of collimated beams S around and parallel to the optical axis OA, having a circular cross-section, is broken by the first axicon A1 into a beam having a circular cross section, wherein the inner and outer diameters of the circular cross-section initially decrease uniformly and then increase uniformly in the outlet direction with increasing distance from the first axicon A1.

The second axicon A2 is arranged at such a distance I from the first axicon A1, that a beam with a circular cross-section meets the conical surface A2.k, which inner diameter is substantially larger than the diameter of the circular cross section of the entrance bundle EB. According to the laws of geometrical optics, the second axicon A2 causes the exit of a beam that is collimated to the optical axis OA since it has the same axicon angle as the first axicon A1, and has a circular cross-section which is approximately equal to the annular cross section of the beam impinging on the conical surface A2.k of the second axicon A2.

This circular bundle of rays, expanded with respect to the entrance bundle EB, now meets the convex surface L.k of the plano-convex aspheric lens L arranged outlet-side, by which it is refracted. The convex surface L.k is shaped such that in accordance with the laws of geometrical optics, all the rays would meet at an outlet-side focal point F.

In one embodiment of the invention, it is possible to use an aspheric lens instead of a plano-convex aspheric lens L, having a curved inlet-side surface that is rotationally symmetrical to the optical axis OA which may be spherical or aspherical, instead of the flat surface L.p. By means of such an aspheric lens, it is possible to focus an entrance bundle EB of rays at a focal point F even if these rays are not perfectly collimated, but have a slight divergence or convergence. Advantageously, by means of such an aspheric lens, a greater robustness can be achieved in respect of a tilting of the individual optical elements of the inventive beam focuser SF towards one another or towards the optical axis OA.

In fact, due to the diffraction of the light, a distribution of the irradiance in the focal plane occurs here as well, which is not concentrated at an infinitesimally small focal point F, but rotationally symmetrically extends beyond same. FIG. 2 schematically illustrates the irradiance profile E_SF obtained with the inventive beam focuser SF, next to the irradiance profile E_L for a purely plano-convex aspheric lens L according to the prior art, without the use of the axicon A1, A2 for beam expansion, wherein both arrays have the same numerical aperture.

As can be seen from FIG. 2, the central maximum, i.e. the area between the two minima or zeros enclosing the maximum, of the irradiance profile E_SF generated with the beam focuser SF is narrower than the central maximum of the irradiance profile E_L according to the prior art. In particular, the area in which the predetermined minimum irradiance E_min is exceeded is also narrower with a beam that is shaped by the beam focuser SF, and corresponds to a circle around the optical axis OA, which radius is determined by the distance value x_SF_min, at which the minimum irradiance E_min is just reached by the irradiance profile E_SF.

In an advantageous manner, thus a more accurate machining of a workpiece or material can be performed with the beam focuser SF when this machining is based on a physical effect, which is triggered only above such a predetermined minimum irradiance E_min, without requiring the numerical aperture to be increased, using the adverse effects known from the prior art.

For those skilled in the art, it is obvious that for an entrance bundle EB that comprises not only accurately collimated beams S, but instead slightly diverging or converging ones, i.e. generally slightly inclined beams S of for example less than 5 degrees, relative to the optical axis OA, results in an irradiance profile that in principle is similar to the illustrated path of the irradiance profile E_SF, in particular with regard to the height and width of the central maximum. Thus, the beam focuser SF can also be advantageously used for not accurately collimated light sources.

What is claimed is:

1. A beam focuser for focusing an entrance bundle of collimated beams around an optical axis in a focus area around a focal point, the beam focuser comprising:
   a first axicon disposed inlet side with an axicon angle;
   a second axicon with the same axicon angle; and
   an imaging optical system arranged outlet-side and arranged in succession, centered along an optical axis,
   wherein the first and second axicon are arranged mirror-symmetrically along the optical axis,
   wherein a focal point of the imaging optical system faces the outlet side of the beam focuser, and wherein on a plane surface of the first axicon and on a plane surface of the second axicon a diffractive optical element is arranged, which transmission function is selected such that a group velocity dispersion and optionally higher-order dispersions of an ultrashort laser pulse are minimized along the beam path by the beam focuser.

2. The beam focuser according to claim 1, wherein the plane surface of the first axicon faces the inlet side, and wherein the plane surface of the second axicon faces the outlet side.

3. A method of focusing a collimated beam with a beam focuser according to claim 1, wherein, within the focus area, an irradiance above a minimum irradiance is achievable for a physical effect, which is substantially absent around the focal point outside of the focus area.

4. The method according to claim 3, wherein the physical effect is based on a polymerization above the minimum irradiance.

5. The method according to claim 3, wherein the physical effect is based on an optical breakthrough above the minimum irradiance.

6. The method according to claim 3, wherein the physical effect is based on the melting of a solid material above the minimum irradiance.

7. An arrangement for carrying out the method according to claim 3, wherein the beam focuser is illuminated by collimated light on the inlet side.

8. The arrangement according to claim 3, wherein the beam focuser is connected to the focus area around the focal point by an immersion liquid with a refractive index greater than 1.

9. The arrangement according to claim 3, wherein, between the beam focuser and the focus area around the focal point, an optically transmissive protective element is arranged.

10. The arrangement according to claim 9, wherein the optically transmissive protective element is replaceable.

11. A beam focuser for focusing an entrance bundle of approximately collimated beams around an optical axis in a focus area around a focal point, the beam focuser comprising:
   a first axicon disposed inlet side with an axicon angle;
   a second axicon with the same axicon angle; and
   an imaging optical system arranged outlet-side and arranged in succession, centered along an optical axis,
   wherein the first and second axicon are arranged mirror-symmetrically along the optical axis,
   wherein a focal point of the imaging optical system faces the outlet side of the beam focuser, and
   wherein the imaging optical system is formed as an aspheric lens.

12. The beam focuser according to claim 11, wherein the imaging optical system has a plane surface on the inlet side.

13. The beam focuser according to claim 11, wherein the imaging optical system has a concave surface on the inlet side.

14. The beam focuser according to claim 11, wherein a distance between the first and second axicon is adjustable.

15. The beam focuser according to claim 14, wherein a radius of curvature at any point of the outlet-side surface and/or at any point of the inlet-side surface of the aspheric lens, depending on a vertical distance of this point from the optical axis, is selected such that upon adjustment of the distance between the first and second axicon, the focus area is shifted around the focal point along the optical axis.

16. The adjusting method for adjusting a beam focuser according to claim 15, wherein by setting a predetermined distance between the first and second axicon, a predetermined distance of the focus area from the imaging optical system corresponding thereto is adjustable.

17. An adjusting method for adjusting a beam focuser according to claim 14 for focusing monochromatic light, wherein, by setting a wavelength-dependent predetermined distance between the first and the second axicon, a focus area around the focal point is adjustable with an minimal cross section for the monochromatic light.

* * * * *